Jan. 13, 1959   W. D. GABOR ET AL   2,868,896
AMPLIFIER-ELECTRICAL CONTROL SYSTEM
Filed March 4, 1953   3 Sheets-Sheet 1

INVENTORS
WILLIAM D. GABOR
JOSEPH L. STAHOVEC
BY
Curtis Morris & Safford.
ATTORNEYS Jan. 13, 1959 W. D. GABOR ET AL 2,868,896
AMPLIFIER-ELECTRICAL CONTROL SYSTEM
Filed March 4, 1953 3 Sheets-Sheet 2

INVENTORS
WILLIAM D. GABOR
JOSEPH L. STAHOVEC
BY
Curtis Morris & Safford
ATTORNEYS INVENTORS
WILLIAM D. GABOR
JOSEPH L. STAHOVEC
BY
Curtis Morris Safford
ATTORNEYS

United States Patent Office 2,868,896
Patented Jan. 13, 1959

2,868,896

AMPLIFIER-ELECTRICAL CONTROL SYSTEM

William D. Gabor, Norwalk, and Joseph L. Stahovec, Springdale, Conn., assignors to C. G. S. Laboratories, Inc., Stamford, Conn.

Application March 4, 1953, Serial No. 340,352

14 Claims. (Cl. 179—171)

This invention relates to electrical control apparatus and more particularly to arrangements for controlling the current through a reactive circuit so that it is an exact replica of a control voltage.

Such apparatus is useful, as one example, in connection with saturable reactance devices. These devices have an inductive control winding which exerts its control influence as a function of the current through it. This current, however, may not be a true replica of the voltage applied to the terminals of the control winding. There are several possible reasons for this: With control signals containing alternating current components, the inductance of the winding modifies the shape of the current wave; even with D.-C. control signals, changes in the resistance of the winding with changes in temperature will cause an undesired variation in the control current. Various methods have been proposed for correcting for this non-linearity in alternating current systems and other methods have been proposed for use in direct current systems; but no entirely practical system has been provided for handling both alternating and direct-current control signals.

In a preferred embodiment of the present invention, the control voltage is fed into a direct current amplifier which is arranged to control the current through a control tube connected in series with the control winding of a saturable reactor or other reactive circuit or element. A separate load resistor also in series with the control tube develops a negative feed-back voltage that is applied to the input circuit of the D.-C. amplifier. The current through the control tube is thereby maintained as a linear function of the applied control voltage. This causes the current through the control winding to have the same linear relationship provided all of the controlled current of the tube flows through the control winding as would be true if a triode tube were used.

It is desirable, however, to use a pentode rather than a triode as the control tube because of its higher gain, that is, less driving voltage is required, and because it can be operated at higher frequencies. If the control winding is connected in series with the anode of the tube, the screen current of the tube does not flow through the control winding: this introduces a relatively large error into the system. The magnitude of this error changes with change in the magnitude of the input signal; also there is considerable variation in the magnitudes of the screen currents of different tubes operating under identical conditions.

In accordance with the present invention, this difficulty is solved by arranging the pentode tube so that both the screen and plate currents flow through the control winding while maintaining the desired linear control of the tube current.

Such a control system is applicable to many types of devices such as precision magnetic-type deflection systems for deflecting electron beams in television tubes, radar display tubes, storage tubes, electron beam computer or gating tubes. etc. The control of flux in ferromagnetic cores has already been mentioned. The system may be used to advantage in these and many other applications where it is desirable to maintain a precision relationship between a control voltage and a control current and in which the control voltage may contain either alternating or direct current components.

The various objects, advantages, and aspects of the invention will be apparent from the foregoing considered in the light of the following detailed description of various embodiments of the invention as illustrated in the accompanying drawings, in which.

Figure 1:
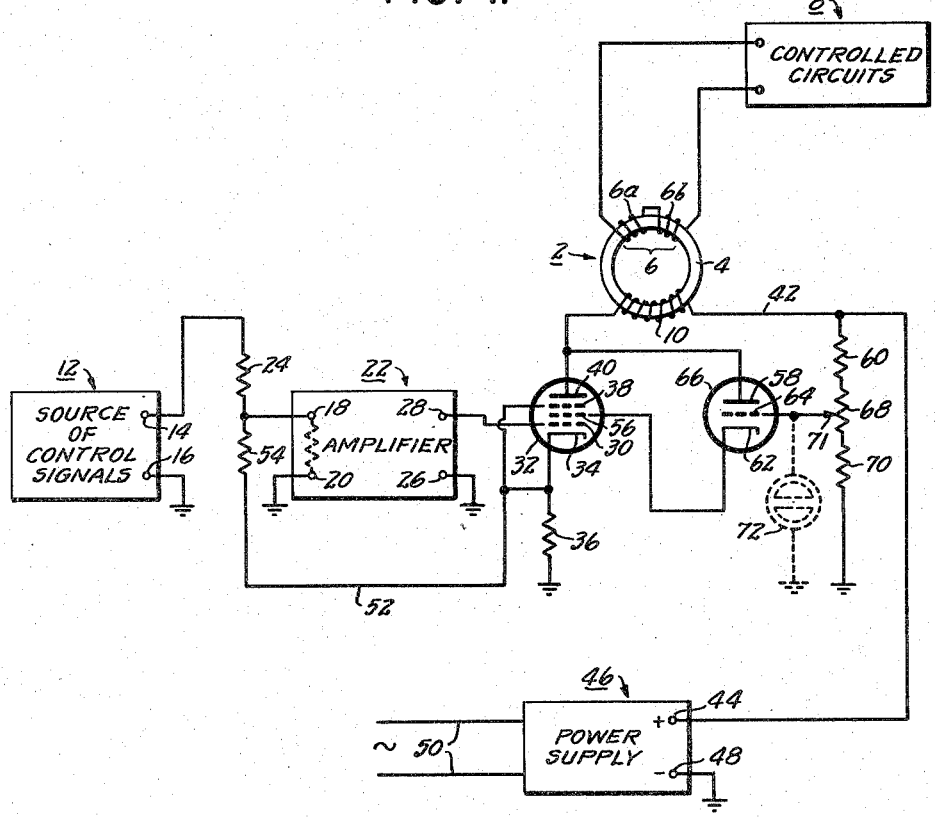
Figure 1 represents schematically a control system embodying the invention.

In Figure 1, a controllable inductor 2 is illustrated as the device to be controlled. This may be, for example, a conventional saturable reactor or it may be a controllable inductor of the type described by Dewitz in U. S. patent application Serial No. 213,548, filed March 2, 1951, and having a ring core 4 of ferromagnetic ceramic material, such as ferrite.

A signal winding 6 is wound on the core 4 and is connected to the circuits to be controlled as indicated in block form at 8. The winding 6 may be formed in two parts 6a and 6b, which are connected in series opposition in such manner as to minimize coupling with a control winding 10 on the same core; all substantially as described in the above-identified patent application.

In order to control the current through the winding 10 as a function of a control voltage supplied by a source indicated in block form at 12, the signal from the output terminals 14 and 16 are applied to the input terminals 18 and 20 of a D.-C. amplifier 22; the terminals 14 and 18 are connected together through an isolation resistor 24 and the terminals 16 and 20 are connected together through the common ground circuit. The amplifier 22 may be of conventional construction such as to handle control signals of whatever characteristics are being used.

The output terminals 26 and 28 of the amplifier 22 are connected respectively to the common ground circuit and to the control grid 30 of a pentode-type control tube 32. This tube is connected in series with the impedance whose current is to be regulated and the magnitude of this current is controlled by the potential produced on the grid 30 by the amplifier 22.

The cathode 34 of this tube is connected through a resistor 36 to the common ground circuit; its suppressor grid 38 is connected directly to the cathode 34; and its anode 40 is connected through the winding 10 and a lead 42 to a positive-voltage supply terminal 44 of a conventional rectifier-filter power supply 46. The negative-voltage supply terminal 48 of this power supply is connected to the common ground circuit. The power supply is energized in the usual manner from alternating-current power mains 50.

The voltage developed across the cathode resistor 36 is fed back to the input of the amplifier 22 as a negative feed-back signal by means of a lead 52 and an isolation resistor 54 connected between the cathode 34 and the input terminal 18 of the amplifier 22. This feed-back signal reduces the gain of the amplifier 22, for example substantially to unity, so that the current through the resistor 36 and the tube 32 is a linear function of the control voltage delivered by the source 12. However, this tube current includes both the plate current and the screen-grid current. Thus, if the screen grid 56 of this tube were connected in the usual manner through a voltage-dropping resistor to the terminal 44, any variation in the screen current would cause an error in the relationship between the current through the winding 10 and the control voltage. Such an arrangement is not satisfactory even when a well-regulated power supply is provided.

In order to overcome this difficulty, both the screen current and the plate current are caused to flow through the winding 10. In the embodiment of Figure 1, the anode 40 is connected to the anode 58 of a triode tube 60 whose cathode 62 is connected to the screen grid 56 of the tube 32. Bias voltage for the control grid 64 of the tube 60 is provided by a voltage divider consisting of a fixed resistor 66, a potentiometer 68, and a second fixed resistor 70 connected in series between the positive supply lead 42 and ground.

The adjustable contact 71 of the potentiometer 68 is connected to the control grid 64. The screen-grid current of tube 32 thus flows from the anode 40 through the tube 60 to the screen grid 56. The magnitude of the screen voltage is controlled by the bias voltage maintained on the grid 64 of the tube 60 and the voltage of the screen grid 56 will be higher by a few volts than the control grid 64 of the tube 60. The tube 60 must have sufficient capacity to handle the screen current of the tube 32 and should have low plate resistance and high mutual conductance. With this arrangement, the variation in the screen voltage with respect to ground can be held to less than one percent.

In some instances, it may be desirable to add a voltage regulator tube, indicated in broken lines at 72. This regulator tube may be a conventional gaseous type regulator tube with a heated cathode or it may be a cold cathode gaseous discharge tube such as an ordinary neon lamp. The regulator tube is connected between the control grid 64 of tube 60 and the common ground circuit.

Figure 2:
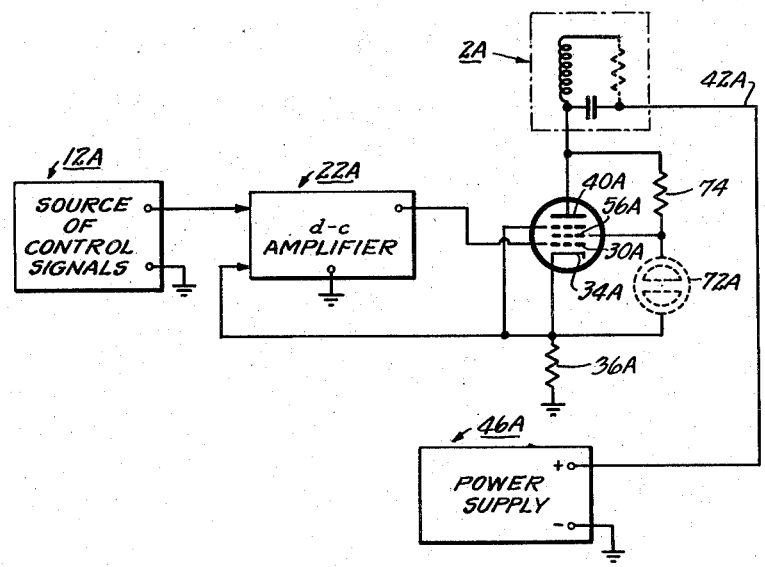
Figure 2 shows a modification of the system of Figure 1 using only a single control tube.

Figure 2 shows an arrangement using only one tube and which is not generally so satisfactory as the system of Figure 1, but which is useful in particular applications. In this figure, certain parts having functions corresponding to the functions of parts of Figure 1 have been given corresponding reference numerals followed by the suffix "A."

The impedance, illustrated diagrammatically at 2A, whose current is to be controlled is connected, as previously described, in series with the positive-voltage supply lead 42A and the anode 40A of the pentode tube 32A. The screen grid 56A is connected through a resistor to the anode 40A, and no auxiliary triode tube is used. As before, both the screen and plate currents flow through the impedance 2A and good linearity is maintained. However, the screen voltage now fluctuates as the current through the tube changes. When the signal voltage applied to the control grid 30A changes in a negative direction to decrease the current through the impedance 2A, the voltage on the screen grid 56A increases, thus tending to cause the plate current to increase and to partially offset the effect of the signal voltage. When the control voltage on grid 30A becomes more positive to increase the current through the impedance 2A, the screen-grid voltage becomes less positive, thus tending to oppose the change produced by the control grid. This results in lower sensitivity of the system, that is, a greater change in control voltage is required to produce a given change in the current through the impedance 2A than is required with the arrangement of Figure 1.

The sensitivity of the system of Figure 2 can be improved somewhat by the addition of the regulator tube 72A connected between the screen grid 56A and the cathode 34A. However, this limits the operating range of the system. When the plate current is high, the voltage at the screen 56A may be insufficient to maintain the ignition of the tube 72A which therefore loses control.

When the plate current of the tube 32A is cut-off, current continues to flow through the impedance 2A, the resistor 74, and the regulator tube 72A. Thus, a certain amount of unregulated current always flows through the impedance 2A. In spite of these disadvantages, the systems represented by Figure 2 will be found advantageous in applications where these particular limitations are not important.

The sensitivity of the system shown in Figure 1 can be improved further if the screen voltage can be made to change in the same direction as the control grid voltage; that is, the screen grid is made to function as a control element to assist the change introduced by the control grid. One way of doing this is shown in Figure 3, which shows a modified arrangement of Figure 1 and in which certain corresponding parts have been given the same reference numerals followed by the suffix "B."

Figure 3:
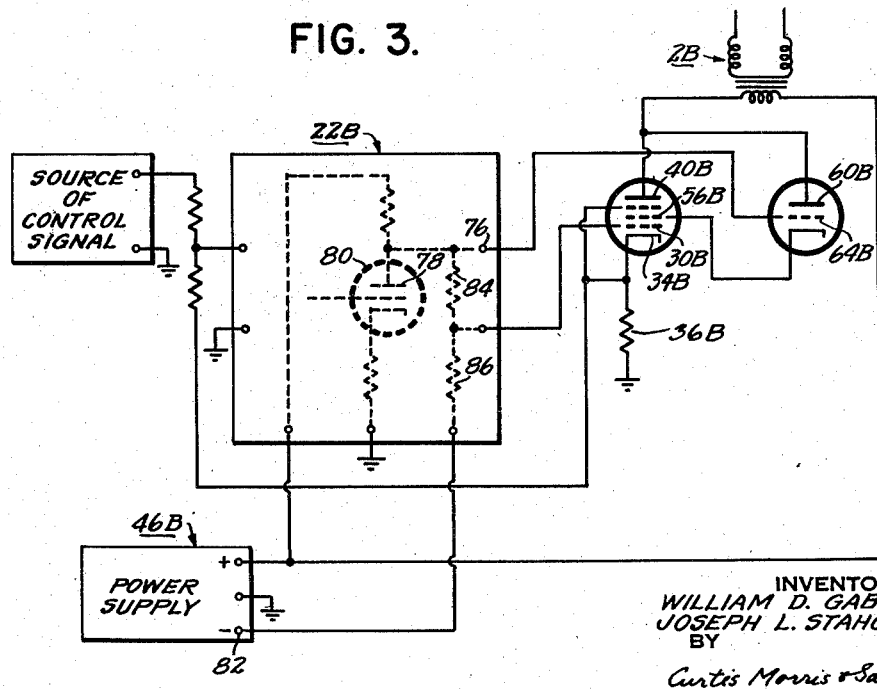
Figure 3 shows another arrangement similar to Figure 1 and particularly useful in applications requiring high sensitivity and maximum stability.

The amplifier 22B of Figure 3 may be identical with the amplifier 22 of Figure 1 except that an additional output terminal 76 is provided which is connected to the anode 78 of the final tube 80 of the amplifier 22B. The pentode tube 32B is connected to the amplifier 22B and the impedance 2B in the same way as in Figure 1. The power supply 46B is shown with an additional negative voltage supply terminal 82 that is connected to the amplifier 22B in order to maintain the correct bias voltage on the control grid 30B, which is connected to the junction of two resistors 84 and 86 connected in series between the anode 78 of tube 80 and the negative supply terminal 82.

The auxiliar screen-control tube 60B is connected as before in series between the anode 40B and the screen grid 56B of the tube 32B. However, the control grid 64B of the tube 60B is now connected to the anode 78 of the amplifier tube 80. With this arrangement, when the control grid 30B of the tube 32B changes in a negative direction, the voltage on the grid 64B also becomes increasingly negative, decreasing the voltage on the screen grid 56B. Thus, when the tube 32B is driven towards cut-off, the screen voltage decreases, conversely when the tube 32B is driven toward full current its screen voltage is increased. This arrangement produces a substantial increase in sensitivity.

Figure 4:
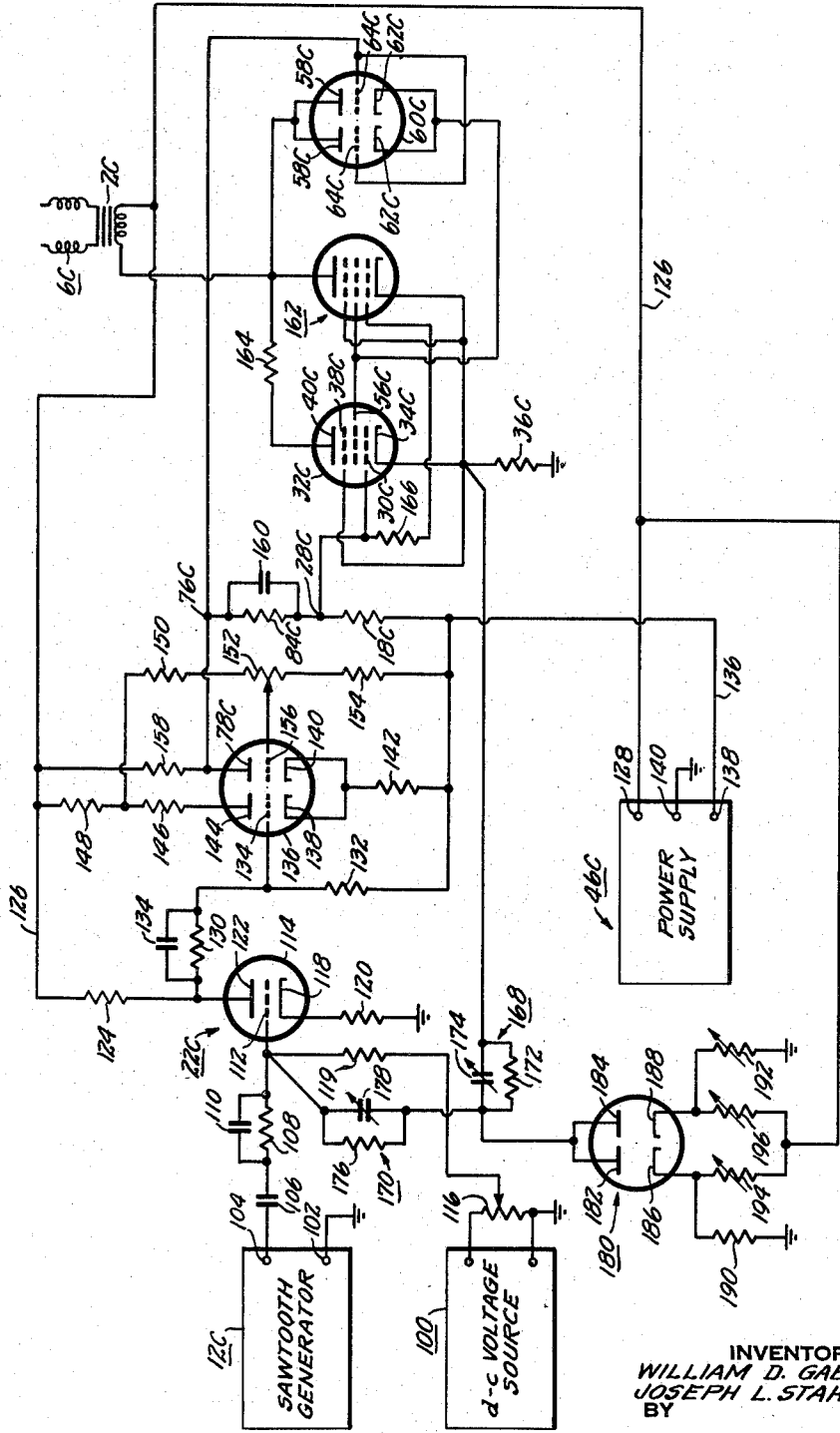
Figure 4 shows the circuit arrangement of Figure 3 as incorporated in a sweep receiver.

Figure 4 shows a commercial embodiment of the control circuit of Figure 3 as incorporated in a sweep frequency device. The windings 6C of the controllable inductor 2C, for example, may form part of a resonant circuit. If a sawtooth wave form from the generator 12C is applied through the amplifier 22C to the control circuit, the resonant frequency of the circuit incorporating the winding 6C may be made to rapidly scan a predetermined range of frequencies. A D.-C. voltage forming source indicated at 100 may also be applied to the amplifier and will permit adjustment of the center frequency about which the frequency of the circuit incorporating the winding 6C sweeps. One output terminal 102 of the generator 12C is connected to the common ground circuit and its other output terminal 104 is connected through a capacitor 106 and a resistor 108, connected in parallel with a condenser 110, to a control grid 112 of a triode vacuum tube 114 which forms the first stage of the amplifier 22C. A potentiometer 116 is connected across the output terminals of the D.-C. voltage source 100 and the adjustable contact of this potentiometer is connected through a resistor 119 to the control grid 112. The magnitude of the D.-C. voltage relative to ground therefore can be adjusted by means of the potentiometer 116 so as to change the frequency of the controlled circuit as mentioned above. The cathode 118 of the tube 114 is connected to ground through a bias resistor 120 and the anode 122 is connected through a load resistor 124 and a positive voltage supply lead 126 to an output terminal 128 of the power supply 46C. A voltage divider circuit comprising two resistors 130 and 132 and a condenser 134 connected in parallel with the resistor 130 is connected between the anode 122 and a negative voltage supply lead 136 which is connected to a negative output terminal 138 to the power supply 46C. A third output terminal 140 of the power supply 46C is connected to the common ground circuit, which is maintained at a potential between the potentials of the output terminals 128 and 138.

The junction of the resistors 130 and 132 is connected directly to a control grid 134 of the twin triode vacuum tube 136. The cathodes 138 and 140 of the two sections of this tube are connected together and through a common bias resistor 142 to the negative voltage supply lead 136.

The anode 144 of the first section of this triode is connected through two resistors 146 and 148 to the positive voltage supply lead 126. A voltage dividing circuit comprising a resistor 150, a potentiometer 152, and a second fixed resistor 154 is connected between the junction of the resistors 146 and 148 and the negative voltage supply lead 136. The adjustable contact of the potentiometer 152 is connected directly to the control grid 156 of the second triode section of the tube 136 which forms the final stage of the D.-C. amplifier. The anode 78C of this section is connected through a load resistor 158 to the positive voltage supply line 126. The anode 78C is connected also to the output terminal 76C and through a voltage-dividing network comprising series-connected resistors 84C and 86C and a condenser 160 connected in parallel with the resistor 84C to the negative voltage supply lead 136. The output terminal 28C at the junction of the resistors 84C and 86C is connected directly to the control grid 30C of the tube 32C.

In order to handle the current for the controllable inductor 2C, a second tube, generally indicated at 162, identical with the tube 32C, has each of its elements connected in parallel with the corresponding element of the tube 32C. Suppressor resistors 164 and 166, however, are provided in the circuit connection between the two anodes and between the two control grids, respectively. Otherwise, the tube 32C is connected and operates substantially in the manner described in connection with Figure 3. The tube 60C is illustrated in the form of a twin triode vacuum tube with the corresponding elements of each section of the tube connected in parallel to increase the current handling capacity of the tube. In other respects, the tube is connected identically with and operates in the same manner as the corresponding tube shown in Figure 3.

The feed-back circuit from the cathode 34C of the tube 32C is connected through two phase-compensating networks 168 and 170 to the control grid 112 of the input tube 114 of the amplifier 22C. The phase shift network 168 is formed by a resistor 172 connected in parallel with a variable condenser 174. The other phase shift network 170 comprises a fixed resistor 176 connected in parallel with variable condenser 178. These phase shift networks correct the phase of the feed-back voltage source to correct for phase shifts which occurred in the amplification and control tube circuits. Ordinarily, saturable reactors and controllable inductors in themselves have a non-linear control characteristic so that it is desirable to introduce a compensating characteristic into the amplifier circuit so that linearity of the controlled currents can be obtained. For this purpose, a twin diode 180 is connected between the junction of the phase shift networks 168 and 170 and the ground circuit and is arranged so that as the amplitude of the feed-back voltage increases, the percentage feed-back is reduced, thereby allowing the amplifier to have increased gain and thereby proportionately increasing the control current. The anodes 182 and 184 of these diodes are connected together and to the junction of the phase shift networks 168 and 170. The anodes 186 and 188 are connected respectively through resistors 190 and 192 to the common ground circuit. The two diodes are biased by means of a positive voltage which is fed from the positive voltage supply lead 126 through two variable resistors 194 and 196, respectively, to the cathodes 186 and 188.

The variable resistors 194 and 196 are adjusted so that at a first D.-C. level of feed-back voltage, one of the diodes starts to conduct, thus reducing somewhat the effectiveness of the feed-back network, and at a somewhat higher voltage the other diode starts to conduct, thus further decreasing the effectiveness of the feed-back network. The values at which these resistors are adjusted will depend upon the particular characteristics of the control mechanism.

In one particular embodiment, the components shown in Figure 4 had the following values:

| Name | Reference Character | Value |
| --- | --- | --- |
| Condenser | 106 | 4 microfarads. |
| Do | 131 | 220 mmf. |
| Condensers | 174, 178 | 7 to 45 mmf. |
| Resistor | 108 | 100,000 ohms. |
| Do | 119 | 100,000 ohms. |
| Do | 120 | 1,000 ohms. |
| Do | 124 | 50,000 ohms. |
| Do | 130 | 100,000 ohms |
| Do | 132 | 400,000 ohms. |
| Do | 142 | 100,000 ohms. |
| Do | 146 | 30,000 ohms. |
| Do | 148 | 15,000 ohms. |
| Do | 150 | 130,000 ohms. |
| Do | 152 | 10,000 ohms. |
| Do | 154 | 200,000 ohms. |
| Do | 158 | 50,000 ohms. |
| Do | 84C | 100,000 ohms. |
| Do | 86C | 300,000 ohms. |
| Do | 36C | 150 ohms. |
| Do | 164 | 100 ohms. |
| Do | 166 | 47 ohms. |
| Do | 168 | 50,000 ohms. |
| Do | 170 | 50,000 ohms. |
| Do | 190 | 100,000 ohms. |
| Do | 192 | 100,000 ohms. |

The tube 114 was a type 6C4; a 12AU7 was used for the dual triode 136; the control tubes 40C and 162 were 6Y6; the dual triode auxiliary tube 60C was a type 5687; and a 6AQ5 was used for the shaper tube 130.

The foregoing examples, which are well suited to attain the ends and objects of the invention, have been set forth to explain the principles of the invention in accordance with the requisite statutes. It will be clear, however, that the embodiments of the invention are adapted to be modified in many different ways so as to best suit the requirements of each particular use, and that certain features of the invention can be used to advantage at times without a corresponding use of other features.

What is claimed is:

1. Apparatus for producing a control current corresponding to a control potential comprising an amplifier connectible to a source of control signals and having input and output circuits, a multi-element vacuum tube having an anode, a cathode, a control electrode, and a screen grid, means coupling an output circuit of said amplifier to said control electrode, an anode-cathode energizing circuit for said tube including a source of direct voltage, current-utilizing means connected in series with said anode energizing circuit and said tube, a screen-grid energizing circuit coupled from said anode-cathode circuit to said screen grid, said screen-grid circuit being effectively in series with said current-utilizing means, whereby both the screen and plate currents of said tube pass through said current-utilizing means, and negative feedback circuit means responsive to the total of both said screen and plate currents of said tube and being coupled to an input circuit of said amplifier.

2. Apparatus for producing a control current corresponding to a control potential comprising an amplifier connectible to a source of control signals and having input and output circuits, a multi-element vacuum tube having an anode, a cathode, a control electrode, and a screen grid, means coupling an output circuit of said amplifier to said control electrode, an anode-cathode energizing circuit for said tube including a source of direct voltage, current-utilizing means connected in series with said energizing circuit and said tube, a current control device having a second control element and connected in series with said current-utilizing means and being between said anode and said screen grid, voltage supply means connected to said second control element, and negative feedback circuit means responsive to the sum of the currents through said anode and through said control device and being coupled to an input circuit of said amplifier.

3. Apparatus for producing a control current corresponding to a control potential comprising an amplifier connectible to a source of control signals and having input and output circuits, a multi-element vacuum tube having an anode, a cathode, a control electrode, and a screen grid, means coupling an output circuit of said amplifier to said control electrode, an anode-cathode energizing circuit for said tube including a source of uni-directional voltage, current-utilizing means connected in series with said energizing circuit and said tube, a current control device having a control element and connected in circuit in series with said current-utilizing means and being between said anode and said screen grid, voltage supply means connected to said control element of said current control device, resistance means connected in series with said anode-cathode circuit of said tube and also in series with the current control device, and a feedback control circuit coupling the voltage developed across said resistance means to the input circuit of said amplifier.

4. Apparatus for controlling an electric current as a function of a control voltage comprising an amplifier connectible to a source of control signals and having input and output circuits, a first multi-element vacuum tube having an anode, a cathode, a control electrode, and a screen grid, circuit means coupling the output circuit of the amplifier to said control electrode, an anode-cathode energizing circuit for said tube including a source of direct voltage, current-utilizing means connected in series with said energizing circuit and said tube, a second multi-element vacuum tube having a cathode, an anode, and a control electrode, and having its anode-cathode circuit connected between said anode and said screen grid of said first tube, bias supply means connected to said control electrode of said second tube resistance means connected in series with said anode-cathode circuits of both said tubes, thereby to carry the sum of the currents through the anode-cathode circuits of both tubes, and a feedback circuit coupling the voltage developed across said resistance means to an input circuit of said amplifier.

5. Apparatus for controling an electric current as a function of a control voltage comprising an amplifier connectible to a source of control signals and having input and output circuits, a first multi-element vacuum tube having an anode, a cathode, a control electrode, and a screen grid, means coupling an output circuit of said amplifier to said control electrode, an anode-cathode energizing circuit for said tube including a source of direct voltage, current-utilizing means connected in series with said energizing circuit and said tube, a second multi-element vacuum tube having a cathode, an anode, and a control electrode and having its anode-cathode circuit connected between said anode and said screen grid of said first tube, a voltage divider circuit connected to said direct voltage source for supplying bias to said control electrode of said second tube, resistance means connected in series with the anode-cathode circuit of said tube and also in series with the anode-cathode circuit of the second tube, whereby said resistance means carries the currents through both tubes, and a feedback circuit coupling the voltage developed across said resistance means to an input circuit of said amplifier.

6. Current control apparatus comprising a direct current amplifier connectible to a source of control signals and having input and output circuits, a multi-element vacuum tube having an anode, a cathode, a control electrode, and a screen grid, means coupling an output circuit of said amplifier to said control electrode, an anode-cathode energizing circuit for said tube including a source of uni-directional voltage, current-utilizing means connected in series with said energizing circuit and said tube, an energizing circuit for said screen grid coupled to said anode, said energizing circuit being effectively in series with said current-utilizing means, whereby both the screen and plate currents of said tube pass through said current-utilizing means, and direct current negative feedback circuit means responsive to the total of both said screen and plate currents of said tube and being coupled to an input circuit of said amplifier.

7. Current control apparatus comprising a direct current amplifier connectible to a source of control signals and having input and output circuits, a multi-element vacuum tube having an anode, a cathode, a control electrode, and a screen grid, means coupling an output circuit of said amplifier to said control electrode, an anode-cathode energizing circuit for said tube including a source of direct voltage, current-utilizing means connected in series with said energizing circuit and said tube, resistance means connected between the cathode of said tube and said energizing circuit, a feed-back circuit coupling the voltage developed across said resistance means to an input circuit of said amplifier, a second multi-element vacuum tube having a cathode, an anode, and a control electrode, and having its anode-cathode circuit connected between said anode and said screen grid of said first tube, and bias supply means connected to said control electrode of said second tube.

8. Current control apparatus comprising an amplifier connectible to a source of control signals and having input and output circuits, a first multi-element vacuum tube having an anode, a cathode, a control electrode, and a screen grid, means coupling said control electrode to an output circuit of said amplifier, an anode-cathode energizing circuit for said tube including a source of direct voltage, current-utilizing means connected in series wtih said energizing circuit and said tube, a second multi-element vacuum tube having a cathode, an anode, and a control electrode, and having its anode-cathode circuit connected between said anode and said screen grid of said first tube, coupling means between said control electrode of said second tube and an output circuit of said amplifier for supplying bias voltage to said second tube control electrode, resistance means connected in series with the anode-cathode circuit of said first tube and also in series with the anode-cathode circuit of said second tube, and a feed-back circuit coupling the voltage developed across said resistance means to the input circuit of said amplifier.

9. Apparatus for producing a control current corresponding to a control potential comprising an amplifier connectible to a source of control signals and having input and output circuits, a multi-element vacuum tube having an anode, a cathode, a control electrode, and a screen grid, means coupling an output circuit of said amplifier to said control electrode, an anode-cathode energizing circuit for said tube including a source of direct voltage, an inductive load circuit connected in series between said energizing circuit and said tube, an energizing circuit for said screen grid coupled to said anode in series with said inductive load, whereby both the screen and plate currents of said tube pass through said inductive load, and a negative feedback circuit responsive to both the screen and plate currents of said tube and connected to the input circuit of said amplifier.

10. Apparatus for producing a control current corresponding to a control potential comprising an amplifier connectible to a source of control signals and having input and output circuits, a first multi-element vacuum tube having an anode, a cathode, a control electrode, and a screen grid, means coupling an output circuit of said amplifier to said control electrode, an anode-cathode energizing circuit for said tube including a source of direct voltage, an inductive load circuit connected in series between said energizing circuit and said tube, a second multi-element vacuum tube having a cathode, an anode, and a control electrode, and having its anode-cathode circuit connected between said anode and said screen grid of said first tube, bias supply means connected to said control electrode of said second tube, a voltage regulator tube interposed between said cathode and said control electrode of said second tube, resistance means conected in series with the anode-cathode circuits of both tubes, and a feed-back circuit connected from said resistance means to an input circuit of said amplifier.

11. Control apparatus for maintaining the current through an inductive load proportional to a control potential comprising a direct current amplifier having an input circuit composed of first and second terminals and an output circuit composed of third and fourth terminals, said first terminal being connected through a first isolation resistor to a source of control signals, said second and fourth terminals being connected to a common ground circuit, a pentode tube having an anode, a cathode, a control electrode, a screen grid, and a suppressor grid, said third terminal being connected to said control electrode, said suppressor grid being connected to said cathode, said cathode being connected to said second terminal through a second isolation resistor, a resistor connected between said cathode and said common ground circuit, a triode tube having an anode, a cathode, and a control electrode, said anodes of said tubes being connected together and through an inductive load to a source of uni-directional potential, said cathode of said triode tube being connected to said screen grid of said pentode tube, and said control electrode of said triode tube being connected to a variable voltage divider interposed between said source of uni-directional potential and said common ground circuit.

12. Apparatus for varying the current through an inductive load in accordance with a control potential comprising, in combination, a source of control signals, a direct current amplifier having an input circuit with first and second terminals and an output circuit with third, fourth, and fifth terminals, a first isolation resistor connected between said first terminal and said source of control signals, said second and fifth terminals being connected to a common ground circuit, a pentode tube having a cathode, an anode, a screen grid, a suppressor grid, and a control grid, said cathode and said suppressor grid being connected together and to said first terminal through a second isolation resistor, said control grid being connected to said fourth terminal, a resistor interposed between said cathode and said common ground circuit, a triode tube having an anode, a cathode, and a control grid, said cathode of said triode being connected to said screen grid of said pentode tube, said control grid of said triode being connected to said third terminal, circuit means connecting said anodes together, and an inductive load interposed between said anodes and a source of unidirectional potential.

13. Apparatus for controlling the current through an inductive load proportional to a control potential comprising, in combination, a source of control signals, a direct current amplifier having an input circuit with first and second terminals and an output circuit composed of a load resistor having variable tap positions thereon and connected between the final stage of said amplifier and a source of negative direct potential, said first terminal being connected through a first isolation resistor to said source of control signals, said second terminal being connected to a common ground circuit, a pentode tube having an anode, a cathode, a screen grid, a control grid, and a suppressor grid, said cathode and said suppressor grid being connected together and to said first terminal through a second isolation resistor, circuit means connecting said control grid to one of the variable taps of said output circuit, a resistor connected between said cathode and said common ground circuit, a triode tube having an anode, a cathode, and a control grid, said cathode of said triode being connected to said screen grid of said pentode tube, and said control grid of said triode tube being connected to one of the variable taps of said output circuit, means connecting said anodes together, and an inductive load connected between said anodes and a source of positive unidirectional potential.

14. Apparatus for producing a control current through the control winding of a controllable inductor corresponding to a control potential comprising a controllable inductor having a control winding, an amplifier connectible to said control potential and having input and output circuits, a multi-element vacuum tube having an anode, a cathode, a control electrode, and a screen grid, an anode-cathode energizing source for said tube connected in circuit through the control winding of the controllable inductor to the anode-cathode circuit of said tube, a screen-grid energizing circuit coupled from said anode-cathode circuit to said screen grid, said screen-grid energizing circuit being in series with the control winding, with both the anode and screen-grid currents of said tube passing through the control winding, and a negative feedback circuit responsive to the total of both said anode and screen-grid currents of said tube coupled to an input circuit of said amplifier, said negative feedback circuit including means providing a characteristic compensating for the control characteristic of the control winding.

References Cited in the file of this patent

UNITED STATES PATENTS

| | | |
|---|---|---|
| 2,251,973 | Beal | Aug. 12, 1941 |
| 2,341,232 | Norton | Feb. 8, 1944 |
| 2,538,488 | Volkers | Jan. 16, 1951 |
| 2,572,832 | Bernard | Oct. 30, 1951 |
| 2,662,125 | Stafford | Dec. 8, 1953 |
| 2,678,391 | Lappin | May 11, 1954 |

FOREIGN PATENTS

| | | |
|---|---|---|
| 139,237 | Austria | Oct. 25, 1934 |